United States Patent Office 3,541,146
Patented Nov. 17, 1970

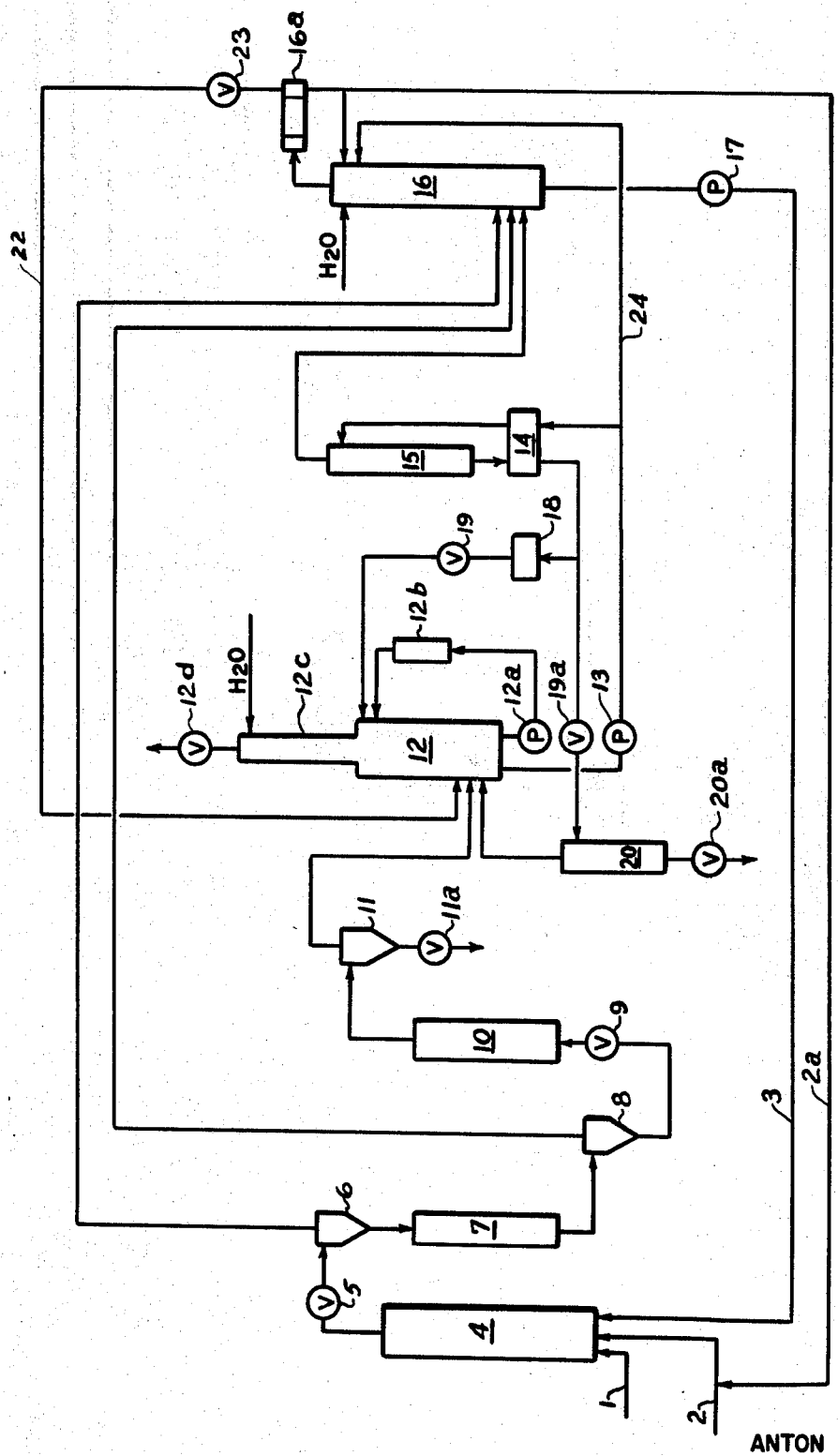

3,541,146
PROCESS FOR THE SEPARATION AND RECIRCULATION OF UNREACTED STARTING GASES IN THE UREA SYNTHESIS
Anton Ledergerber and Lung-Pao Chen, Domat-Ems, Switzerland, assignors to Inventa A.G. für Forschung und Patentverwertung, Zurich, Switzerland
Filed Nov. 29, 1966, Ser. No. 597,817
Int. Cl. C07c 127/00
U.S. Cl. 260—555    7 Claims

ABSTRACT OF THE DISCLOSURE

The invention relates to a process for the separation and recirculation of unreacted starting gases present in the synthesis of urea from ammonia and carbon dioxide and, more particularly, to such a process whereby no prior separation of these gases from each other is carried out.

---

A number of separating and recycling processes are known. For instance, it had previously been proposed to introduce the decomposition gases liberated upon expansion of the reaction melt and ensuing heat input into liquid $NH_3$ whereby a suspension of solid ammonium carbamate in the liquid $NH_3$ forms. This suspension must be recirculated through an external condenser to remove excess heat and then must be returned into the reactor by means of a high pressure pump. Considerable difficulties are encountered in this process not only due to deposits in the gas condenser, in the cooling condenser and in the conduits, but also because suspensions of this kind have a highly concentrated solids content and are not easily pumped. Therefore, this process has not been used on a production scale.

Other suggestions avoid the difficulties named by adding sufficient water to the starting products to be recycled so that, at the temperatures employed, no solid constituents are present. The quantity of water added may be the smaller, the higher the temperature at which the formation of the recirculated liquid occurs. On the other hand, higher temperatures require higher pressure above the solution in order to keep the components in condensed state.

All processes named have in common the feature whereby the formation of the solution containing the bulk of the carbamate to be recycled occurs approximately at the same pressure at which the separation of the corresponding carbamate mixture from the urea melt had taken place. Because the separation of a large part of the carbamate, formed in the synthesis at high pressure, requires correspondingly high temperatures, comparatively large quantities of water must be employed for total recycling or approximately total recirculation, or extremely high decomposition temperatures, or both.

Since a considerably large water addition to the recirculation solution greatly reduces the reaction of carbamate to urea within the reactor because of the reaction equilibrium, the throughput through the reactor and recovery plant is greatly increased. This, in turn requires a corresponding increase in the heat input for the separation of the excess ammonia, ammonium carbamate and water from the urea.

It is well known that the urea melt is highly sensitive to heat with respect to the formation of biuret which is harmful even in small quantities for many end purposes. This biuret formation is influenced by the height of the temperature, by the duration of the heat action on the melt and the amount of heat put into the reaction. If the decomposition temperatures are limited to a permitted degree, considerable water addition is required for total or approximately total recirculation according to the processes named above and thus an increased throughput with the ensuing drawbacks as described.

In order to avoid these difficulties and disadvantages it had been proposed and carried out with good technical effect to proceed in such a manner that the bulk or at least a portion of the solution containing the recycled ammonium carbamate is formed at higher pressure than that for the decomposition of the ammonium carbamate which had not been reacted to $NH_3$ and $CO_2$ and for their separation from the urea melt.

This has been set forth in Swiss Pat. 387,015.

Such a procedure has the advantage that, in contrast to the processes theretofore known according to which the recirculation of the carbamate gases is carried out in the form of pure and solids-free solutions, the throughput and thus the heat transferred to the urea solution during the carbamate decomposition and water removal can be held very low because of the small quantities of water involved. Thereby the temperature also can be held low so that only a very slight biuret formation occurs.

However, this process has the disadvantage that the portion of the recirculation solution formed at higher pressure than that at which the components of this portion are separated from the urea solution by decomposition is relatively large. Hence, the heat requirements for the transport of this portion to the higher pressure level is considerable.

It now has been found that this process can be improved to a great extent by modifications which are slight per se while a much better economy of the process can be attained. The process for the separation and recirculation of unreacted ammonia and carbon dioxide according to the invention has as its salient features the expansion of the mixture of urea, water, ammonium carbamate and excess ammonia, which had been formed in the autoclave under pressure, in at least two pressure steps in order to separate the unreacted starting gases. This is carried out in such a manner that the expanded gases obtained in the first expansion step, i.e., $NH_3$ and $CO_2$, are conducted, together with the gas removed from the urea melt under like pressure by heating and consisting of excess ammonia and ammonia plus $CO_2$, into a condenser which is under the same pressure. In a second expansion step at lower pressure, the expansion and decomposition gases thus obtained are absorbed in an aqueous ammonium carbonate solution. This solution then is put to the pressure of the first expansion step and is freed from $NH_3$ and $CO_2$ by heating whereafter the expelled and largely dehydrated gases conducted to a condenser which is under the same pressure as the first expansion step therein to be condensed together with the expansion and decomposition gases from the first expansion step to a highly concentrated solution of $NH_3$ and $CO_2$ in little water. This solution then is recycled into the synthesis reactor.

In order to obviate crystallization of carbamate in the highly concentrated recycling solution, a portion of the ammonia conducted into the pressure condenser can be condensed, if required, in a head condenser connected to said pressure condenser; a part of the condensate therein obtained may be directly pumped into the synthesis autoclave and the remainder recycled into the pressure condenser with addition of a very small amount of water which suppresses the crystallization of carbamate.

The same result may be obtained under certain conditions if a portion of the solution obtained by the absorption of the gases from the second expansion step is conducted directly into the pressure condenser without dehydration.

The invention will now be further explained with reference to the accompanying drawing and later by the example also referring to the drawing. However, it should be understood that all this is given merely by way of illustration, and not of limitation, and that changes may be made in the details without departing from the spirit and the scope of the invention as hereinafter claimed.

The drawing is a flowsheet showing the several different process steps.

Referring now to this drawing, fresh ammonia and fresh $CO_2$ are introduced into the synthesis autoclave 4 through conduits 1 and 2, respectively, and recovered starting gases are introduced through conduits 2a and 3. Urea is produced in autoclave 4 at a pressure of 150–300 atmospheres and at temperatures of 150–220° C. The reaction mixture consisting of urea, excess ammonia, water and ammonium carbamate is adiabatically expanded, by means of reducing valve 5, to a lower pressure level, preferably to 20–70 atmospheres. A portion of the vaporous part of the reaction mixture, consisting of excess ammonia, ammonium carbamate and water, is released from the melt in separator 6 whereby the temperature of the mixture decreases from 150–220° C. to 105–120° C. The temperature decrease has the effect that these released gases have a very low water content, namely 3–7 weight percent. These gases are conducted from separator 6 directly into the pressure condenser 16.

The remaining melt is transported from separator 6 into the decomposer 7 wherein it is heated at a pressure of 20–70 atmospheres to 130–160° C. Thereby, the bulk of the excess ammonia is driven off together with $CO_2$ and $NH_3$ which had formed by the decomposition of ammonium carbamate. The release gas from this first expansion step contains 7–20 weight percent water. It is separated from the remaining melt in separator 8 and conducted directly into the pressure condenser 16.

The remaining melt is transferred from separator 8 through the expansion valve 9 into a second decomposer 10 which operates at lower pressure, i.e., at 2–10 atmospheres and at temperatures of 100–145° C. Therein practically all remaining excess ammonia which originally had been present is removed, and the remainder of the carbamate decomposed to ammonia and carbon dioxide. These gases then are separated from the urea melt which contains water and very small quantities of ammonia and undecomposed ammonium carbamate, in the separator 11.

The melt is removed from separator 11 by means of valve 11a and contains, besides urea, water and in general undecomposed carbamate and a little free $NH_3$. It is then finished in the conventional manner, e.g., crystallized or prilled. The gases leaving separator 11 at pressures of 2 to 10 atmospheres and a temperature of 100–140° C. opportunely are refined according to the following method which is known per se and has been described in the aforementioned Swiss Pat. 387,015.

The gases consisting of $NH_3$, $CO_2$ and $H_2O$, separated from vessel 11 are conducted to absorber 12 wherein they are almost completely condensed in a concentrated aqueous solution of carbamate or carbonate or a mixture of both with free $NH_3$. The heat to be removed thereby can be removed, e.g., through a cooling cycle by means of pump 12a and condenser 12b.

The absorption solution can contain a total of 5–35 weight percent $NH_3$ during supply and 10–50 percent during runoff.

The inert gases, fed in together with fresh ammonia and $CO_2$ through conduits 1 and 2 first are introduced into pressure condenser 16, thence through valve 23 and conduit 22 into absorber 12 and then can be removed under entrainment of a small amount of $NH_3$ through conduit 12d. They thereby leave the system.

The additional washer 12c normally is disposed on top of absorber 12 but also can be installed separately. It is provided for the contingency that the inert gases carry more than just a small amount of ammonia with them and is provided with a water wash. 12d is a valve on top of 12c.

The pressure in absorber 12 approximately corresponds to that in separator 11, the temperature of the solution, depending upon the cooling water conditions, is 20–80° C., and preferably 40–60°.

The solution leaving absorber 12 is highly concentrated and is conducted, by means of pump 13, to heat exchanger 14 for preheating and thence into the distillation column 15 which is under approximately like pressure as separator 8. The column has a sump temperature of 160–200° C. From the head of distilling column 15 $NH_3$ and $CO_2$ are removed together with little steam and conducted into pressure condenser 16.

From the sump of column 15 a solution is removed which is poorer in the contents of $CO_2$ and $NH_3$ corresponding to the gases separated. Heat is removed from the discharge solution in heat exchanger 14 and used to heat the countercurrently flowing solution flowing into 14. The bulk of the solution is cooled additionally in condenser 18 and expanded through a butterfly valve or the like 19 and recycled into absorber 12 where it is again concentrated by absorption of the gases. The remainder of the solution is expanded through butterfly valve 19a and conducted into distilling column 20 wherein the quantity of water is removed from the system which is required for the $H_2O$ balance. Thereby, the $NH_3$ and $CO_2$ present are driven off and returned into absorber 12.

By the operation as described gas from the second expansion step, removed from separator 11 and containing ammonia, carbon dioxide and relatively large amounts of water, is largely dehydrated and again put into the higher pressure step.

After this step, the process according to the invention again differs from the known method as named in the Swiss patent cited above.

Because the gas removed from separator 6 contains a minimum of water, the water content of the return gases combined in pressure condenser 16 is so low that carbamate is precipitated in the pressure condenser as the reaction product of $CO_2$ and $NH_3$. These combined return gases are the mixture of gas from separators 6 and 8 and from the head of column 15.

In order to maintain the required minimum water content in the return solution, the pressure condenser 16 additionally is connected to a head condenser 16a. Therein ammonia is condensed, a part of the condensate is directly returned into the synthesis autoclave by way of conduit 2a, and the remainder recycled into pressure condenser 16 with addition of a slight amount of water to suppress the crystallization of carbamate. In the pressure condenser, the mixture of $NH_3$, $CO_2$ and $H_2O$ is liquified without any carbamate crystallizing out, and the mixture is returned into the synthesis autoclave by means of high pressure pump 17 through conduit 3. To prevent crystallization of carbamate, it is also feasible to conduct a portion of the undehydrated solution from absorber 12 through conduit 24 directly into pressure absorber 16.

The advantage of the process according to the invention over the processes hitherto known and particularly over the cited Swiss Patent resides in the fact that the quantities of water returned into the reactor which decreases the yield can greatly be reduced or, even if these quantities remain the same, the relative water content in the return solution is increased, so that lower operational pressure can be maintained in the pressure condenser so that less carbamate and $NH_3$ of lower pressure of the second decomposition step is to be brought to the higher pressure in the pressure condenser and, hence, the required heat input is considerably reduced.

The following example serves to illustrate an embodiment of the invention corresponding to the above description and the use of the device in the drawing.

EXAMPLE

Starting materials into reactor:

Through conduit 1—737 kg./h. $CO_2$
Through conduit 2—1,153 kg./h. $NH_3$
Through conduit 3—1,012 kg./h. recycling solution consisting of: $NH_3$, 400 kg./h.; $CO_2$, 360 kg./h.; $H_2O$, 252 kg./h.

The reaction of the starting materials occurs in reactor 4 at a pressure of 210 atmospheres and a temperature of 185° C.

The reaction mixture leaving reactor 4 by way of expansion valve 5 has the following composition:

| | | | |
|---|---|---|---|
| Urea, kg./h | *1,000 | Urea, kg./h | 1,000 |
| $NH_3$, kg./h | 988 | $NH_3$ (free), kg./h | 708 |
| $CO_2$, kg./h | 362 | Carbamate, kg./h | 642 |
| $H_2O$, kg./h | 552 | $H_2O$, kg./h | 552 |
| Total, kg./h | 2,902 | Total, kg./h | 2,902 |

* Respectively.

After expansion at a pressure of 42 atmospheres and a temperature of 120° C., the following gas composition is removed from separator 6:

| | Kg./h. |
|---|---|
| $NH_3$ | 348 |
| $CO_2$ | 74 |
| $H_2O$ | 20 |
| Total | 442 |

Remaining in the melt are:

| | | | |
|---|---|---|---|
| Urea, kg./h | *1,000 | Urea, kg./h | 1,000 |
| $NH_3$, kg./h | 640 | $NH_3$ (free), kg./h | 418 |
| $CO_2$, kg./h | 288 | Carbamate, kg./h | 510 |
| $H_2O$, kg./h | 532 | $H_2O$, kg./h | 532 |
| Total, kg./h | 2,460 | Total, kg./h | 2,460 |

* Respectively.

The melt is heated in decomposer 7 and a portion of the carbamate is decomposed. The following gas mixture is removed from separator 8:

| | Kg./h. |
|---|---|
| $NH_3$ | 394 |
| $CO_2$ | 198 |
| $H_2O$ | 104 |
| Total | 696 |

The remaining melt leaves separator 8 through expansion valve 9 and is conducted into the low pressure decomposer 10 which is held at a pressure of 5 atmospheres and at 135° C. The gas removed from separator 11 has the following composition:

| | Kg./h. |
|---|---|
| $NH_3$ | 230 |
| $CO_2$ | 80 |
| $H_2O$ | 240 |
| Total | 550 |

This gas is absorbed in absorber 12 as described above, is brought to the higher pressure level and thereby freed from the bulk of the entrained water. From the head of distilling column 15 the following gas mixture is recovered:

| | Kg./h. |
|---|---|
| $NH_3$ | 243 |
| $CO_2$ | 88 |
| $H_2O$ | 60 |
| Total | 391 |

The combined gases which finally are conducted into pressure condenser 16 have the following composition:

| From | Separator 6 | Separator 8 | Column 15 | Total |
|---|---|---|---|---|
| $NH_3$, kg./h | 348 | 394 | 243 | 985 |
| $CO_2$, kg./h | 74 | 198 | 88 | 360 |
| $H_2O$, kg./h | 20 | 104 | 60 | 184 |
| Total, kg./h | 442 | 696 | 391 | 1,529 |

This gas is condensed in pressure condenser 16. The heat of condensation is removed partially or entirely in head condenser 16a. From the condensate of the head condenser, 585 kg./h. $NH_3$ are removed which are free of $CO_2$ and $H_2O$ and this $NH_3$ pumped through conduit 2a directly into reactor 4. The remainder is fed into column 16 as runoff with the addition of 68 kg./h. $H_2O$ to wash traces of $CO_2$ which could clog the head condenser out of the rising gas.

The following recycling or return solution is removed from the sump of pressure condenser 16, and recycled into reactor 4 by means of pump 17 through conduit 3:

| | Kg./h. |
|---|---|
| $NH_3$ | 400 |
| $CO_2$ | 360 |
| $H_2O$ | 252 |
| Total | 1,012 |

We claim as our invention:

1. In a process for the manufacture of urea from gaseous $CO_2$ and an excess of gaseous $NH_3$ under pressure in an autoclave, the improvement of returning unreacted starting gases from the urea melt obtained into the reaction which comprises expanding the mixture leaving said autoclave and consisting of excess $NH_3$, $CO_2$, $H_2O$ and ammonium carbamate in at least two expansion steps of diminishing pressure; separating in the first expansion step by said expansion $NH_3$ and $CO_2$; combining them with gases driven off by heating said urea melt, said gases consisting of excess $NH_3$ and $CO_2$ plus $NH_3$ derived from the decomposition of ammonium carbamate formed; condensing said combined gases at still the same pressure; collecting, in a second expansion step, expansion gases and decomposition gases and absorbing them in aqueous ammonium carbonate solution to form a resulting solution; said ammonium carbonate solution containing 5 to 35 weight percent $NH_3$ during supply of said expansion gases and decomposition gases thereto, said resulting solution containing 10 to 50 weight percent $NH_3$ upon delivery therefrom; adjusting the pressure above said resulting solution to correspond to that of said first expansion step and heating the resulting solution to liberate absorbed $NH_3$ and $CO_2$ thereby substantially dehydrating the same; condensing said liberated $NH_3$ and $CO_2$ at like pressure as in the first expansion step; combining said condensed liberated $NH_3$ and $CO_2$ with decomposition gases and expansion gases from said first expansion step; adding water thereto to form a concentrated aqueous solution of $NH_3$ and $CO_2$, said water being added in an amount just sufficient to act as a crystallizatiton depressant thereby preventing ammonium carbamate from crystallizing out of said concentrated solution; then returning said concentrated solution into said autoclave.

2. The process as defined in claim 1, wherein the pressure in said autoclave is substantially 150–300 atmospheres; the pressure in said first expansion step is substantially 20–70 atmospheres; and the pressure in said second expansion step is substantially 2–10 atmospheres.

3. In a process for the manufacture of urea from gaseous $CO_2$ and an excess of gaseous $NH_3$ under pressure in an autoclave, the improvement of returning unreacted starting gases from the urea melt obtained into the reaction which comprises expanding the mixture leaving said autoclave and consisting of excess $NH_3$, $CO_2$, $H_2O$ and ammonium carbamate in at least two expansion steps of diminishing pressure; separating in the first expansion step by said expansion $NH_3$ and $CO_2$; combining them with gases driven off by heating said urea melt, said gases consisting of excess $NH_3$ and $CO_2$ plus $NH_3$ derived from the decomposition of ammonium carbamate formed; condensing said combined gases at still the same pressure; collecting, in a second expansion step, expansion gases and decomposition gases and adsorbing them in aqueous ammonium carbonate solution to form a resulting solution; said ammonium carbonate solution containing 5 to 35 weight percent $NH_3$ during supply of said expansion gases and decomposition gases thereto, said resulting solution containing 10 to 50 weight percent $NH_3$ upon delivery therefrom; returning a portion of said resulting solution to said first expansion step; adjusting the pressure above said resulting solution to correspond to that of said first expansion step and heating a remaining portion of said resulting solution to liberate absorbed $NH_3$ and $CO_2$ thereby substantially dehydrating the same; condensing said liberated absorbed $NH_3$ and $CO_2$ at like pressure as in the first expansion step; combining said condensed liberated absorbed $NH_3$ and $CO_2$ with decomposition gases and expansion gases from said first expansion step to form a concentrated aqueous solution of $NH_3$ and $CO_2$; and returning said concentrated solution into said autoclave.

4. The process as defined in claim 3 wherein the pressure in said autoclave is substantially 150–200 atmospheres; the pressure in said first expansion step is substantially 20–70 atmospheres; and the pressure in said second expansion step is substantially 2–10 atmospheres.

5. In a process for the manufacture of urea from gaseous $CO_2$ and an excess of gaseous $NH_3$ under pressure in an autoclave, the improvement of returning into the reaction unreacted starting gases from the urea melt, which comprises expanding the mixture leaving said autoclave and consisting of excess $NH_3$, $CO_2$, $H_2O$ and ammonium carbamate in at least two expansion steps of diminishing pressure; separating in the first expansion step by said expansion $NH_3$ and $CO_2$; combining them with gases driven off by heating said urea melt, said gases consisting of excess $NH_3$ and $CO_2$ plus $NH_3$ derived from the decomposition of ammonium carbamate formed; condensing said combined gases at still the same pressure to produce a condensate comprising ammonium carbamate, and gaseous $NH_3$; circulating said gaseous $NH_3$ to a condenser for removal of condensation heat; adding to said condensate a quantity of water just sufficient to suppress crystallization of ammonium carbamate; at least a portion of the condensed $NH_3$ being then recycled into said autoclave; collecting, in a second expansion step, expansion gases and decomposition gases and absorbing them in aqueous ammonium carbonate solution to form a resulting solution; said ammonium carbonate solution containing 5 to 35 weight percent $NH_3$ during supply of said expansion gases and decomposition gases thereto, said resulting solution containing 10 to 50 weight percent $NH_3$ upon delivery therefrom; adjusting the pressure above said resulting solution to correspond to that of said first expansion step and heating the resulting solution to liberate absorbed $NH_3$ and $CO_2$ thereby substantially dehydrating the same; condensing said liberated absorbed $NH_3$ and $CO_2$ at like pressure as in the first expansion step; combining said condensed liberated absorbed $NH_3$ and $CO_2$ with decomposition gases and expansion gases from said first expansion step to form a concentrated aqueous solutiton of $NH_3$ and $CO_2$; and returning said concentrated solution into said autoclave.

6. The process as described in claim 5, further including the step of returning a part of the condensed gaseous $NH_3$ to the aqueous ammonium carbonate solution.

7. The process as defined in claim 5 wherein the pressure in said autoclave is substantially 150–300 atmospheres; the pressure in said first expansion step is substantially 20–70 atmospheres; and the pressure in said second expansion step is substantially 2–10 atmospheres.

References Cited

UNITED STATES PATENTS

| | | | |
|---|---|---|---|
| 3,366,682 | 1/1968 | Heunks | 260—555 |
| 3,248,425 | 4/1966 | Ledergerber | 260—555 |

FOREIGN PATENTS

| | | |
|---|---|---|
| 1,001,188 | 8/1965 | Great Britain. |
| 271,206 | 12/1963 | Australia. |

LEON ZITVER, Primary Examiner

M. W. GLYNN, Assistant Examiner